United States Patent [19]

Tanaka

[11] Patent Number: 4,488,868
[45] Date of Patent: Dec. 18, 1984

[54] APPARATUS AND METHOD FOR THE COMBUSTION OF WATER-IN-OIL EMULSION FUELS

[76] Inventor: Akeo Tanaka, No. 565, Tobori, Himeji-shi, Hyogo, Japan

[21] Appl. No.: 604,122

[22] Filed: Apr. 17, 1984

Related U.S. Application Data

[63] Continuation of Ser. No. 376,048, May 7, 1982, abandoned.

[30] Foreign Application Priority Data

May 15, 1981 [JP] Japan .................. 56-72200

[51] Int. Cl.$^3$ ............................................ F23D 11/44
[52] U.S. Cl. .................................. 431/243; 431/164; 431/190; 431/353; 431/4
[58] Field of Search .................. 431/4, 9, 164, 126, 431/173, 182, 185, 190, 337, 243, 352, 353; 239/405, 406

[56] References Cited

U.S. PATENT DOCUMENTS

| | | | |
|---|---|---|---|
| 27,321 | 3/1872 | Briggs | 431/352 |
| 336,485 | 2/1886 | Kennedy | 431/173 |
| 2,958,194 | 11/1960 | Bayley | 431/352 |
| 2,973,727 | 3/1961 | Northcote | 431/173 |
| 3,533,717 | 10/1970 | Guerin | 431/182 |
| 3,975,141 | 8/1976 | Sweet | 431/182 |
| 4,054,028 | 10/1977 | Kawaguchi | 431/353 |
| 4,113,425 | 9/1978 | Linde et al. | 431/173 |
| 4,118,171 | 10/1978 | Flanagan et al. | 431/352 |
| 4,352,572 | 10/1982 | Chen et al. | 431/4 |

FOREIGN PATENT DOCUMENTS

| | | | |
|---|---|---|---|
| 1148255 | 6/1957 | France | 431/166 |
| 736635 | 9/1955 | United Kingdom | 431/352 |

*Primary Examiner*—Samuel Scott
*Assistant Examiner*—Noah Kamen
*Attorney, Agent, or Firm*—Sughrue, Mion, Zinn, Macpeak, and Seas

[57] ABSTRACT

An apparatus and method for the combustion of water-in-oil emulsion fuels are described. The apparatus is fitted to the top of a burner and the fuel is burned in the apparatus whereby the rapid and complete combustion of the fuel is achieved. The apparatus includes an inner vessel open at both ends, with one end being fitted to the burner and a baffle coaxially attached to the inner vessel at the other end thereof which has a frusto-conical configuration with a plurality of holes therethrough. An outer vessel is coaxially mounted on the inner vessel with both ends being secured to the corresponding ends of the inner vessel to form a preheating chamber between the inner and outer vessels. Pressurized air is introduced into the preheating chamber, around the baffle and through the holes into the interior of the inner vessel to compress the flame of the water-fuel emulsion forcing it to swirl and remain in the inner vessel.

3 Claims, 1 Drawing Figure

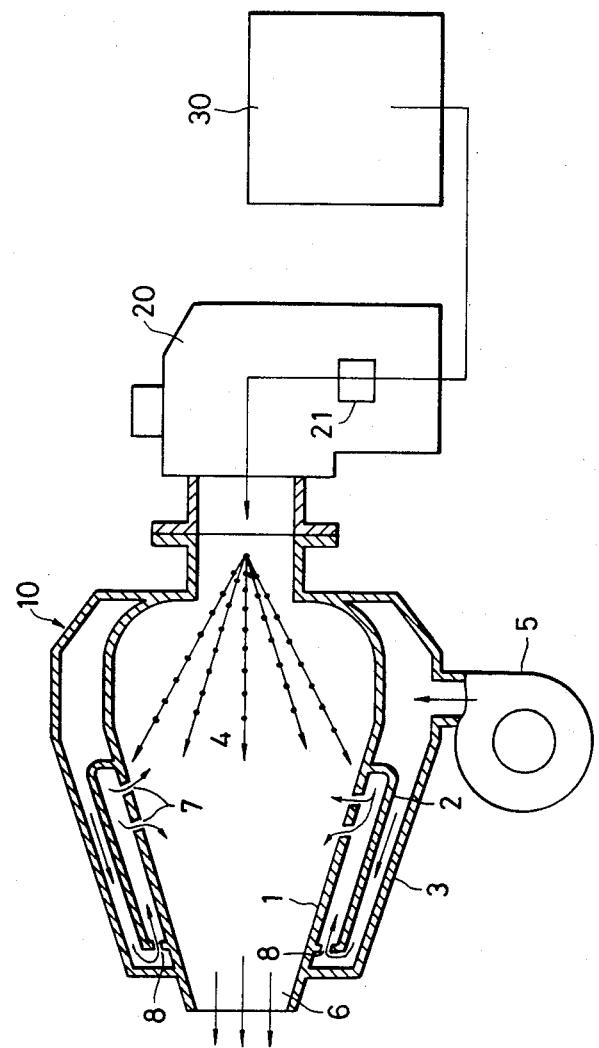

APPARATUS AND METHOD FOR THE COMBUSTION OF WATER-IN-OIL EMULSION FUELS

This application is a continuation, of application Ser. No. 376,048, filed May 7, 1982, now abandoned.

BACKGROUND OF THE INVENTION

The present invention relates to the combustion of water-in-oil emulsion fuels. More specifically, it relates to an apparatus and a method for the combustion of water-in-oil emulsion fuels, which enables a great increase in the combustion efficiency of the fuel by utilizing the water-gas shift reaction of the water-in-oil emulsion.

It is known to mix fuels with water and burn them as so-called water-in-oil emulsions. In these emulsion fuels, however, the amount of water added is limited by the necessity of preventing heat-loss of the flame in order to increase the combustion efficiency of the fuel, or achieving complete combustion with the theoretical amount of air. Furthermore, since the combustion efficiency of a fuel varies significantly depending upon the structure of the combustion apparatus, the type of fuel, the heating conditions, and so forth, water-in-oil emulsions have poor general-purpose properties. Thus, the effective upper limit of the amount of water which can be added is about 20% or less, and it is difficult to reduce the amount of fuel consumed by a proportion exceeding 15%.

It has thus been desired to develop an apparatus and method for the combustion of such emulsion fuels which enables an increase in the water content of the fuel, and which conducts combustion at high efficiency.

SUMMARY OF THE INVENTION

The present invention relates to an apparatus to be fitted to the top of a burner for combustion of emulsion fuels which includes an inner vessel open at both ends. One of the ends if fitted to the burner, and a baffle is coaxially attached to the inner vessel at one end thereof. The other end thereof is open and forms an air-preheating zone in combination with the inner cylindrical vessel. An outer vessel is coaxially mounted on the inner vessel, and both ends are secured to the corresponding ends of the inner vessel to form a closed chamber between the inner and outer vessels. The inner vessel is provided with a frustoconical outlet portion having a plurality of holes at the portion surrounded by the baffle so that compressed air introduced from outside the outer vessel into the closed chamber can be admitted into the inner vessel through the air-preheating zone, whereby the flame of the water-in-oil emulstion fuel from the burner is compressed, and is forced to swirl and remain in the inner vessel by the compressed air jetted through the holes, causing the micro-explosion of water particles and at the same time, pyrolysis of the water/oil emulsion.

A method for the combustion of such emulsion fuels by the use of a burner includes the steps of jetting the water-in-oil emulsion fuel from the burner into an apparatus attached to the top of the burner and burning it in the apparatus, and introducing compressed air into the apparatus to cause the flame of the fuel to be compressed and forced to swirl and remain in the apparatus, causing the micro-explosion of water particles and at the same time, pyrolysis of the emulsion.

BRIEF DESCRIPTION OF THE DRAWING

The single FIGURE is a cross-sectional view of an apparatus according to the invention, fitted to a burner for the combustion of water-in-oil emulsion fuels.

DETAILED DESCRIPTION OF THE PREFERRED EMBODIMENTS

In accordance with the invention, a combustion apparatus of heat-resistant structure is designed so that compressed air can be introduced thereinto as a swirl flow and is fitted to the top of an oil burner, and water/oil emulsion fuels are burned therein. Even when fuels having a water content as high as from 40 to 50% are burned, combustion efficiency can be increased without causing heat-loss by utilizing the high calorific gases resulting from the water gas shift reaction in the combustion reaction. That is, the water/oil emulsion is mixed and compressed in the combustion apparatus at high temperatures from 700° to 1,000° C. by the preheated swirling air stream and is pyrolized by the residence phenomenon. The effect of the simultaneous combustion of hydrogen and water gases formed by the above-described pyrolysis, and the synergistic effects resulting from the rapid and complete combustion of the fuel by oxygen in lesser amounts than the theoretical air amount, greatly increase the combustion efficiency of water-in-oil fuels and, therefore, markedly improve the general-purpose properties of such fuels.

The above shift reaction is based on the following reaction formulae:

$$C_mH_n + mH_2O \rightleftharpoons mCO + (m+n/2)H_2$$

$$CO + H_2O \rightleftharpoons CO_2 + H_2$$

$$CO + 3H_2 \rightleftharpoons CH_4 + H_2O.$$

The extent to which the reaction proceeds is determined by the equilibrium constant under the reaction conditions.

The pyrolysis of heavy oil proceeds as follows:

$$C_mH_n \rightarrow mC + (n/2)H_2.$$

The gases formed in the above reactions and the carbon and hydrogen formed by the above pyrolysis undergo the following exothermic reactions:

$$C + O_2 = CO_2 + 97.6 \text{ Kcal/mol}$$

$$H_2 + \tfrac{1}{2}O_2 = H_2O + 68.3 \text{ Kcal/mol}$$

$$CH_4 + 2O_2 = CO_2 + 2H_2O + 234.2 \text{ Kcal/mol}$$

$$CO + \tfrac{1}{2}O_2 = CO_2 + 68.2 \text{ Kcal/mol}.$$

In the combustion of water-in-oil emulsion fuels in the combustion apparatus of the invention, the high calorific gases formed in the above reactions are utilized, permitting a great reduction in fuel under any condition in which the burner is used, compared with the combustion of oil alone by means of commercially available oil burners, or even when compared with the combustion of water/oil fuels without the use of the combustion apparatus of the invention. Furthermore, emulsion fuels having a water content as high as from 40 to 50% can be burned in the combustion apparatus of the invention. This leads to a marked reduction in the amount of $NO_x$, $SO_3$, etc. produced. Thus, the apparatus and method of the invention are very useful from the viewpoint of pollution prevention.

The invention will hereinafter be explained in greater detail with reference to the accompanying drawing.

Referring to the FIGURE, there is shown a combustion apparatus 10 of the invention comprising an inner 1, a baffle 2 for pre-heating intake air, and an outer vessel 3. The inner vessel 1 is provided with a large diameter central cylindrical portion 1a, an inwardly tapered rear portion 1b having a reduced diameter opening secured to the outlet of an oil burner 20 and a frusto-conical front portion 1c having a reduced diameter opening. The outer vessel 3 is provided with a configuration similar to the inner vessel 1 and is secured at opposite ends to the inner vessel in spaced relation thereto to define a first preheating chamber. The outlet of a blower 5 is connected to the first preheating chamber in the vicinity of the cylindrical portion 1a for supplying secondary air under pressure to the first preheating chamber. A plurality of small holes are provided in the frusto-conical portion 1c of the inner vessel. A baffle 2 is disposed in spaced relation to the frusto-conical portions of the inner and outer vessels and is connected at one end to the inner vessel between the holes 7 and the cylindrical portion 1a to define a second preheating chamber which is in communication with the first at the other end of the baffle. Thus, the air from the blower 5 is introduced into the second preheating chamber, through the first preheating chamber and the compressed air is then jetted into the interior of the inner vessel through the holes 7 to compress the flame of the water-fuel emulsion from the burner 20, forcing it to swirl and remain in the inner vessel.

The water-in-oil emulsion which has been mixed and compressed by the pre-heated secondary air stays in the inner vessel 1 which is heated to about 700° to 1,000° C. Fine water droplets in the emulsion are caused to explode by such high temperature. Simultaneously with evaporation, pyrolysis of the water occurs and, furthermore, the above shift reaction is caused to occur. The thus-formed hydrogen or water gas and the sprayed fuel oil mix together, and the resulting mixture is burned. Furthermore, the oxygen simultaneously formed by the pyrolysis of the water permits rapid and complete combustion with lesser amounts of air than the theoretical amount and, therefore, the amount of fuel oil being consumed can be greatly reduced.

COMPARATIVE EXAMPLE

Case A

Heavy oil A and water were mixed in a ratio of 100 to 65 (ratio of water addition, 39.4%) to prepare a water-in-oil emulsion fuel. The thus-prepared fuel was burned in the combustion apparatus of the invention fitted to a commercially available gun type burner.

Case B

An emulsion containing 20% water was burned by the use of the burner alone.

Case C

Heavy oil A alone was burned.

In accordance with each of the methods of Cases A, B and C, the fuel was burned at an oil pressure of 10 kg/cm$^2$ in a combustion furnace having an effective diameter of 800 mm and an effective length of 2,000 mm, which was used to heat the atmosphere for use in the curing step of a dipped polyvinyl chloride article. The results are shown the table below.

TABLE

|  | Case A | Case B | Case C |
| --- | --- | --- | --- |
| Ratio of Water (%) | 39.4 | 20 | 0 |
| Ratio of Heavy Oil A to Water | 100/65 | 100/25 | 100/0 |
| Flame Temperature (°C.) | 1,350 | 1,250 | 1,280 |
| Ratio of Oil Consumed in Relative % | 60 | 85 | 100 |
| Heat Efficiency of Burner (Relative %) | 167 (100) | 118 (71) | 100 (60) |
| Amount of Oil Consumed (l/hour) | 12.6 | 17.85 | 12.0 |

In accordance with the invention, the heat efficiency of a burner can be increased by 67% relative to the case where heavy oil alone is used, and the amount of oil consumed can be reduced to 60%. Thus, the apparatus and method of the invention can greatly contribute to energy-savings.

What is claimed is:

1. An apparatus for a burner for the combustion of a water-oil emulsion having at least a water content of about 40 percent comprising an inner vessel having an imperforate large diameter substantially cylindrical portion, an inwardly tapered rear portion having imperforate side walls and a reduced diameter end opening adapted to be secured to the outlet of an oil burner and a frusto-conical front portion having a reduced diameter opening, an outer vessel surrounding said inner vessel in spaced relation and secured thereto at opposite ends to define a secondary air preheating chamber, a plurality of holes formed in said frusto-conical front end portion of said inner vessel for communicating said preheating chamber with the interior of said vessel, baffle means secured to said inner vessel intermediate said inner and outer vessels in overlying relation to said holes and air supply means for supplying compressed air to said preheating chamber whereby the compressed air will be introduced into the interior of said inner vessel through said holes for compressing the flame of the water-oil emulsion emanating from said burner and forcing said flame to swirl and remain in said inner vessel thereby causing the micro-explosion of water particles and at the same time the pyrolysis of the water-oil emulsion.

2. An apparatus as set forth in 1 wherein said air supply means are connected to said preheating chamber in the vicinity of said central portion of said inner vessel and said baffle means are comprised of an annular plate disposed parallel to said frusto-conical rear portion in overlying relation of said holes with the space between said plate and said inner vessel being closed at the end of said plate adjacent said air supply means and open at the opposite end.

3. A method for the combustion of a water-oil emulsion fuel having at least a water content of about 40% comprising jetting the water-oil emulsion fuel from a burner into a combustion chamber defined by an inner vessel attached to the burner, preheating a compressed secondary air in a preheating chamber located between said inner vessel and an outer vessel at a temperature of 700° to 1000° C. and introducing said preheated compressed air into the combustion chamber through a plurality of aperatures in a frusto-conical portion of the inner vessel remote from the burner to compress the flame of the jetted water-oil emulsion fuel and force it to swirl and remain in the combustion chamber thereby causing the micro-explosion of the water particles and at the same time the pyrolysis of the water-oil emulsion fuel.

* * * * *